United States Patent [19]

Dorrance

[11] 4,278,650

[45] Jul. 14, 1981

[54] METHOD FOR PRODUCING OXYGEN AND HYDROGEN FROM WATER

[75] Inventor: William H. Dorrance, Ann Arbor, Mich.

[73] Assignee: Organization Control Services, Inc., Ann Arbor, Mich.

[21] Appl. No.: 133,352

[22] Filed: Mar. 24, 1980

[51] Int. Cl.³ .......................... C01B 1/08; C01B 13/00
[52] U.S. Cl. .................................... 423/579; 423/657
[58] Field of Search .................... 423/579, 648 R, 657

[56] References Cited

U.S. PATENT DOCUMENTS

| | | | |
|---|---|---|---|
| 3,789,106 | 1/1974 | Hay | 423/648 R |
| 3,963,830 | 6/1976 | Kasai et al. | 423/579 |

OTHER PUBLICATIONS

Olsen, *Unit Processes and Principles of Chemical Engineering*, D. Van Nostrand Company, Inc., (1932), pp. 1–3.

*Primary Examiner*—O. R. Vertiz
*Assistant Examiner*—Wayne A. Langel
*Attorney, Agent, or Firm*—Olsen and Stephenson

[57] ABSTRACT

Water is fed into a high temperature pressurized vessel containing hydrated large-port mordenite having a high Si/Al ratio and containing a cation that is selected from a specified group of metals and that is in its highest oxidation state. The high temperature causes an endothermic redox reaction that produces oxygen gas and, as a solid reaction product, a large-port mordenite wherein the metal cation is in a lower oxidation state. The solid reaction product is passed through a heat exchanger, where it is cooled and then into a second pressurized reaction vessel at low temperature whereby there occurs an exothermic redox reaction that produces hydrogen gas and which oxidizes the cation back to its highest oxidation state. The large-port mordenite generated in the second reaction vessel is passed through the heat exchanger, where it is heated, and then back into the first reaction vessel for recycling. Pressurization is employed in the reaction vessels to prevent dehydration and this, together with the composition of the mordenite and the use of the heat exchanger, provides high thermal efficiency.

9 Claims, 1 Drawing Figure

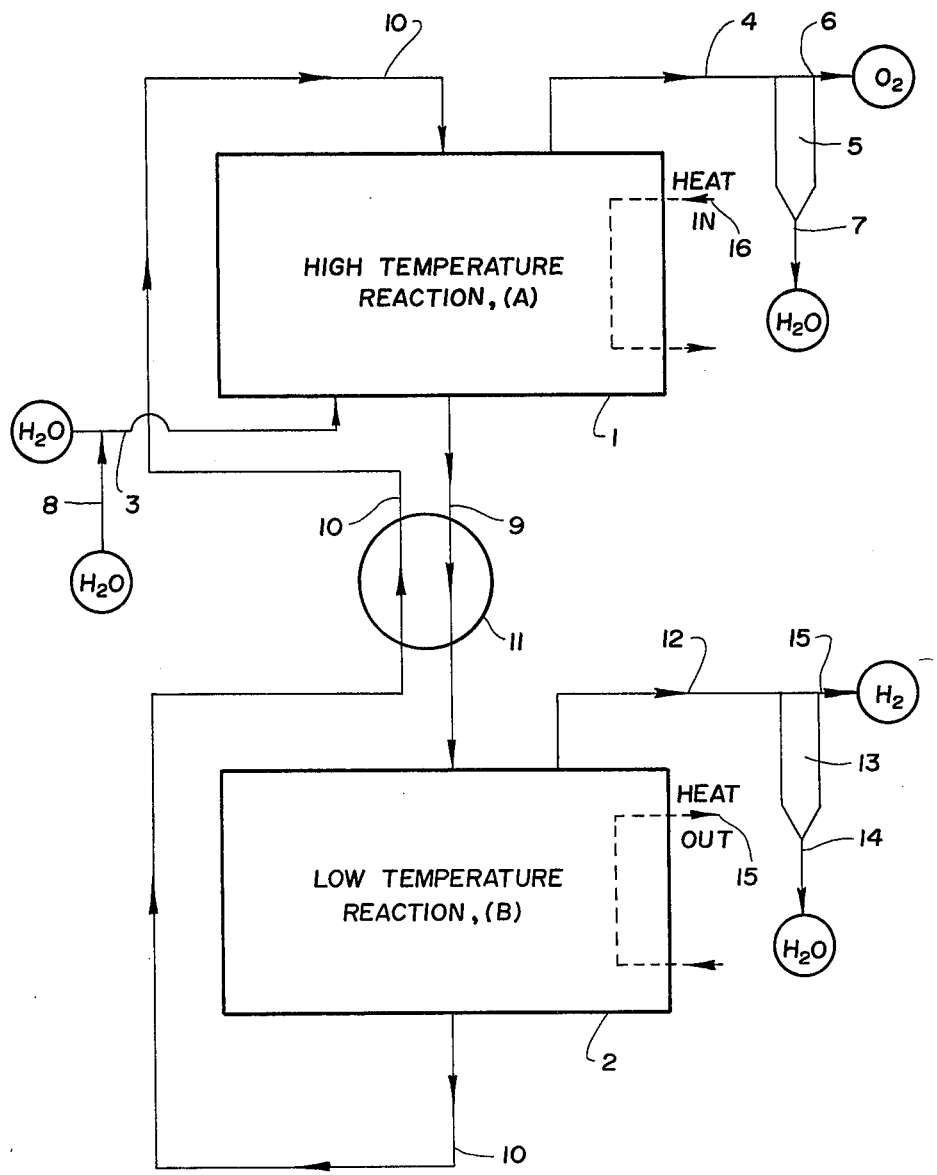

METHOD FOR PRODUCING OXYGEN AND HYDROGEN FROM WATER

TECHNICAL FIELD

The subject matter of the present invention is a method for splitting water into hydrogen and oxygen.

BACKGROUND ART

Vast quantities of hydrogen will be required when this chemical replaces hydrocarbon liquids and gases as the world's primary fuel. The logical source for this hydrogen is $H_2O$, water, which covers over 70% of the earth's surface. When hydrogen is burned the original hydrogen source, water, is 100% reproduced. Thus, no depletion of the fuel resource occurs.

However, more energy is consumed than is produced in the form of hydrogen when water is decomposed. A prime energy source such as solar, fission or fusion energy is required. In order to minimize the energy demand on these intrinsically complex and expensive prime energy sources the thermal efficiency of the coupled water-splitting process must be maximized. This recognition has served as the impetus for a world-wide research and development effort to determine the most efficient means for splitting water into hydrogen and oxygen.

It has long been recognized that a potentially most efficient method for splitting water is that of using closed thermochemical cycles. In such closed cycles water is introduced as a reactant to one or more of several intermediate chemical reactions composing such a cycle, the sum of the reactions of which is $H_2O \rightarrow H_2 + \frac{1}{2}O_2$. Such cycles can be more efficient in the consumption of process heat than is water electrolysis.

By the laws of thermodynamics it can be shown that for maximum efficiency a thermochemical cycle accepting heat at a specified high temperature and rejecting heat at a specified low temperature must be a two-reaction cycle. This principle, based on sound thermodynamics, stands inviolate and it is only because of the lack of success, to date, in the search for and development of a two-reaction cycle to full potential that much recent effort has focused on cycles involving three or more reactions, no matter the sacrifice in potential thermal efficiency that this involves.

U.S. Pat. No. 3,963,830 discloses a two-reaction process for splitting water into hydrogen and oxygen by the use of a hydrated zeolite. The hydrated zeolite is contained in a reaction vessel at high temperature where it is contacted by the water with a resultant endothermic redox reaction wherein dehydration of the zeolite occurs and oxygen gas is produced. Then the reaction vessel is cooled with a resultant exothermic redox reaction in which there is rehydration of the zeolite and wherein hydrogen gas is produced. The cycle is then repeated by reheating the reaction vessel and flowing in additional water to produce further oxygen gas while again dehydrating the zeolite, followed by again cooling the reaction vessel to produce further hydrogen gas and to again rehydrate the zeolite.

While this process disclosed in the patent does provide a means for nonelectrolytically splitting water in a two-reaction cycle, it has a number of deficiencies resulting in thermal inefficiencies of such a magnitude as to render the process noncompetitive with electrolysis or with thermochemical cycles involving three or more reactions. One of the most serious disadvantages is that the entire process is predicated on the dehydration and rehydration of the zeolite. Thermodynamic calculations, verified by laboratory measurements, establish that if the oxygen-producing reaction is predicated on dehydration, there is inherent thermal inefficiency in that the heat energy required to break the bonds of water of hydration is of sufficient magnitude to reduce the thermal efficiency of the cycle below 10%. For comparison, the thermal efficiency of modern water electrolysis is about 20%. Hence, if a zeolite based process for splitting water is to be competitive even with electrolytic processes, dehydration and rehydration of the zeolite must be eliminated.

Another serious deficiency of the process disclosed in the aforesaid patent, resulting in excessive thermal inefficiency, is that it requires energy input for the repeated cyclical heating and cooling of the reaction vessel and contents in which both the oxygen-producing and the hydrogen-producing reactions occur. The temperature differential required must exceed about 200° C., and rejection of heat from the cycle during cool-down constitutes a heat loss of sufficient magnitude alone to reduce the thermal efficiency of the cycle so greatly as to be noncompetitive.

A still further deficiency of the process taught in the aforesaid patent is that it does not itself inherently produce the hydrogen and oxygen at the high pressure required for efficient storage and pipeline distribution. If, subsequent to generation of the oxygen and hydrogen, there is requirement to pressurize these gases in order to attain the pressures needed for efficient storage and distribution, then the energy input required for such subsequent pressurization can itself diminish the overall efficiency to the point of being noncompetitive.

DISCLOSURE OF INVENTION

The present invention involves a closed two-reaction process for producing oxygen and hydrogen from water that is based upon redox reactions of a cation contained within a hydrated large-port mordenite having an Si/Al ratio of from 5 to 30 and with the cation thereof being from the group of metals herein specified. Two reaction vessels are used. One reaction vessel is for the high temperature, oxygen-producing reaction, the temperature in this vessel being at least 500° C. and as high as 950° C.; and the other reaction vessel is for the low temperature, hydrogen-producing reaction, the temperature in this vessel being from about 200° C. to 400° C. The reactant-bearing hydrated mordenite circulates between the oxygen-producing and hydrogen-producing reaction vessels.

Mordenite dehydration is avoided in both reaction vessels by pressuring the vessels above the dehydration pressure, a steam pressure above 75 psia always being present in both reaction vessels. Each metal cation-loaded hydrated mordenite has a particular dehydration pressure (analogous to vapor pressure over water) at each temperature. If the steam pressure over the reactant mass is maintained above this dehydration pressure no significant dehydration can occur. In the present invention the pressure is maintained sufficiently high at all reaction temperatures to assure that dehydration does not occur. Because of its high Si/Al ratio, the mordenite has excellent thermal stability allowing the use of a high temperature for the oxygen-producing reaction and this, together with the selection of the cation metal, contributes further to the efficiency.

The process provides efficient transfer of heat from the solid products of the high temperature, oxygen-producing reaction as they are cooled down to the temperature of the hydrogen-producing reaction. This heat is transferred to the cooler solid products of the hydrogen-producing reaction as they are being transported to the higher temperature oxygen-producing reaction as incoming reactants. In this way the intrinsic heat of the high temperature solid reaction product is kept within the process instead of being lost to the surroundings with consequent large thermal efficiency degradation. Because a high pressure, well above atmospheric, is maintained in both reaction vessels, the oxygen and hydrogen generated are at high pressure as withdrawn from the vessels and hence can be efficiently transported and stored without need for a later separate pressurizing step.

Hence, in accordance with the invention, gaseous water is brought into contact, in a first reaction vessel, with a hydrated large-port mordenite having an Si/Al ratio of from 5 to 30 and containing cation that is selected from the hereinafter specified group of metals and which is in its highest oxidation state, the temperature and pressure in the vessel being sufficient to cause, without dehydration of the mordenite, an endothermic redox reaction which produces oxygen gas and, as a solid reaction product, a hydrated large-port mordenite wherein the metal cation is in a lower oxidation state. The oxygen is removed as a product and the solid reaction product is passed through a heat exchanger and then into a second reaction vessel maintained at a lower temperature, and under pressure, whereby there occurs an exothermic redox reaction which produces hydrogen gas and that oxidizes the cation to its highest oxidation state thereby to convert the solid reaction product entering the second reaction vessel to hydrated large-port mordenite the same as in the first reaction vessel prior to the oxygen-producing reaction. The hydrogen gas is withdrawn from the second reaction vessel and the large-port mordenite generated therein is passed through the heat exchanger where it is heated by the heat removed from the solid reaction product from the first reaction vessel, the so-heated large-port mordenite from the second reaction vessel then being fed back into the first reaction vessel for recycling. Pressurization of both vessels is employed to prevent dehydration, the total pressure in each of the vessels in all instances being above 150 psia at equilibrium such that the partial pressure of steam is above 75 psia. This pressurization provides the gaseous reaction products, oxygen and hydrogen, at a high pressure suitable for efficient transmission and storage. The cation of the mordenite is selected from the group consisting of copper, chromium, vanadium, iron, cobalt, nickel, holmium, promethium, samarium, ytterbium, europium, indium, thallium, uranium, titanium, ruthenium and rhodium.

In the preferred embodiment the two-reaction process is continuous, water being continuously fed into the first reaction vessel, oxygen and hydrogen being continuously withdrawn from the first and second reaction vessels respectively, and the solid reaction product from the first reaction vessel being continuously circulated through the heat exchanger to the second reaction vessel while the solid reaction product from the second reaction vessel is continuously circulated through the heat exchanger back to the first reaction vessel. However, it is within the purview of the invention in its broadest scope to use an interrupted cycle wherein the reactions in the two reaction vessels occur simultaneously, during which water is fed into the first reaction vessel and oxygen and hydrogen are withdrawn from the first and second reaction vessels respectively, followed by an interruption in the feed of water and withdrawl of the gases during which the reaction product from the first reaction vessel is passed through the heat exchanger to the second reaction vessel while the reaction product of the second reaction vessel is simultaneously passed through the heat exchanger to the first reaction vessel, and then with repetition of this interrupted cycle.

BRIEF DESCRIPTION OF DRAWING

The appended drawing is a schematic flow diagram of the preferred embodiment of the invention and apparatus for the practice thereof.

BEST MODE FOR CARRYING OUT THE INVENTION

Mordenite is a natural and manufactured aluminosilicate compound from within the zeolite mineral family. Zeolites are porous crystalline materials the underlying structure of which is composed of linked $AlO_4$ and $SiO_4$ tetrahedra. This porous structure possesses varying degrees of geometrical symmetry depending on the proportions and linkage of these tetrahedra. Over 100 distinct zeolite structures are known. Because of the valence states of Al and Si within the underlying zeolite structure a charge imbalance exists. The porous underlying aluminosilicate structure is anionic (negative) and therefore must be neutralized with offsetting positive charge bearing cations. In mineral mordenite, that charge-balancing cation is generally that of the sodium, $Na^+$. The crystalline unit cell formula for 100% charge-balanced dehydrated sodium mordenite (Na-mordenite) is

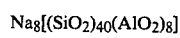

Within mordenite, as within most zeolite materials, a large fraction of the charge-balancing cations are located within or closely adjacent to the pores of the zeolite. When the pores are large enough these cations are accessible to polarizable and electrically neutral adsorbed molecules such as water, $H_2O$. Water molecules diffuse into the pores of zeolites where they are attracted to such localized sites of electric charge. There being an abundance of $H_2O$ in nature, the mineral mordenite contains appreciable adsorbed water commonly referred to as water of hydration. The formula for 100% hydrated Na-mordenite is

That is, a maximum of 24 water molecules per unit cell can be adsorbed into Na-mordenite.

Because of porosity of the structure and the accessibility of the charge-balancing cations within zeolites they are used widely for ion-exchange, water softening, selective adsorption-extraction, molecular sieving, and catalyst supports in chemical processes. A number of companies manufacture zeolite materials to specification.

In commercial practice a zeolite is classed as a "large port" sieve if it freely admits molecules with critical diameters of 5 angstroms (5 times $10^{-8}$ cm) into its pores. Only a fraction of the known zeolites are classified as large port.

Large-port mordenite is unique and specified for the present invention for three reasons:
1. The ratio of Si to Al within the underlying crystalline structure is originally 5, and can be increased. This ratio is the highest of that of all zeolite materials. The higher this ratio, the more stable is the zeolite structure to high temperatures. Mordenite structure is known to be stable to temperatures above 900° C.
2. The large port pores in mordenite are cylindrical channels having elliptical cross-sectional critical dimensions of about 7 angstroms by 7.3 angstroms. As such they freely admit $H_2O$, $O_2$ and $H_2$ molecules and allow for ion-exchange of a large number of metal cations.
3. The chemical activities of metal cations exchanged into mordenite can be varied by varying the proportions of Si to Al within the underlying mordenite structure.

Of that which is known of over 100 zeolite materials only large-port mordenite possesses the above desirable characteristics.

Because the feature of having a ratio of Si to Al (hereafter denoted by $\lambda = Si/Al$) variable and greater than 5 is important to the present invention, one of the frequently used methods for changing the ratio will now be described, it being understood that the practice of this invention is not restricted to any one method of changing the ratio of Si to Al.

$H^+$ cation is exchanged with the $Na^+$ cation in Na-mordenite using known and well-established ion exchange techniques. For example, H-mordenite so prepared is supplied by a number of manufacturers. The unit cell formula of dehydrated H-mordenite after 100% $H^+$ exchange is $$H_8[(SiO_2)_{40}(AlO_2)_8]$$

Following such an exchange, H-mordenite is washed with an acid such as aqueous HCl, $H_2SO_4$ or $HNO_3$, upon which structural Al sites are leached out and replaced in the underlying crystalline structure by 4H. (These 4H are not to be confused with the more exposed remaining charge-balancing $H^+$ cations.) After leaching of structural Al cations in this way the proportions within a dehydrated H-mordenite unit cell become $$H_{(40/\lambda)}[(SiO_2)_{40}(AlO_2)_{(40/\lambda)}]$$

where $\lambda = Si/Al$ and after leaching is greater than 5. The mordenite crystal structural geometry is unchanged whereas, because the ratio Si/Al is increased, the concentration of charge-balancing $H^+$ ions per unit cell is decreased.

A typical sequence for performing the leaching process would start with high temperature calcination (about 700° C.) to remove impurities in the pores. Following this the H-mordenite would be washed, under reflux, with 1 N to 10 N HCl for a period of time depending upon the degree of Al leaching or resulting $\lambda = Si/Al$ ratio desired.

The remaining $H^+$, charge-balancing, cations in the main pores of H-mordenite so treated can be ion-exchanged with a large number of metal cations (denoted as $M^{n+}$ in that which follows: M denotes a metal and n+ is the metal's highest state). Water softening involves similar ion exchanges, for example. When $M^{n+}$ is exchanged with $H^+$ there results (for 100% exchange) M-mordenite. Until cell proportions, including the water of hydration, after 100% exchange of $M^{n+}$ for $H^+$ become $$M_{(40/n\lambda)}[(SiO_2)_{40}(AlO_2)_{40/\lambda}] \cdot xH_2O$$

where x can be from 2 to 24 depending on the value of $\lambda$ and the precise cation metal, M, used. If there is less than 100% exchange of $M^{n+}$ for $H^+$ there will be some $H^+$ in the unit cell, however, for practice of the present invention it is preferred that there be at least about 50% exchange, the greater the exchange the better.

The $M^{n+}$ cations so exchanged into the main pores of large-port mordenite possess a greater $H_2O$ attraction energy than does $Na^+$. If, for example, n+ is equal to 3+, the attraction between $M^{3+}$ and $H_2O$ molecules is far stronger than that of $Na^+$ for $H_2O$ molecules. (The attraction energy is roughly proportional to $n^2$.) Therefore $M^{3\pm}$ loaded mordenite requires more heat energy to accomplish dehydration than does, for example, $M^{2+}$ or $M^+$ loaded mordenite. This feature affects the equilibrium conditions of any redox reaction between the $M^{n+}$ within the large-port mordenite and $H_2O$. The mordenite used for the practice of the invention can have from 2 to 24 moles of water of hydration per unit cell.

The consequences of being able to vary the ratio $\lambda = Si/Al$ within mordenite are important to the present invention. When $\lambda$ is increased above 5 the spacing between the $AlO_2^-$ sites lining the main pores of mordenite is thereby increased. When this spacing increases the energy of the bonds between the charge-balancing cation $M^{n+}$ and the anionic or negative underlying aluminosilicate structure is lessened for all cations $M^{n+}$ for which n is 2 or greater. Because this binding energy is decreased as $\lambda$ increases, the thermochemistry for a redox reaction of $H_2O$ with $M^{n+}$ is changed. The research upon which the present invention is based reveals that the number of different metal cations which can be used in mordenite-hosted $H_2O$ splitting redox reactions is greatly increased when the ratio $\lambda = Si/Al$ can be increased above 5.

The research further revealed that dehydration must be avoided during the endothermic $O_2$ producing reaction. Heat energy input devoted to breaking hydration bonds during the $O_2$ producing reaction is wasteful because if cannot be retained within the process and thus acts to reduce the process thermal efficiency to unattractive or noncompetitive low values.

Suitable metals, their highest and lowest oxidation states to be employed, mordenite concentration parameters, Si/Al to be used, and the maximum realizable cycle efficiency at maximum temperatures up to 950° C. for total pressures of 150 psia and above are specified on Table 1.

TABLE 1

| Metal M | Highest Oxidation State | Lowest Oxidation State | Si/Al = $\lambda$ | Maximum Cycle Efficiency |
|---|---|---|---|---|
| Cu | 2+ | 1+ | 10–25 | .569 |
| Cr | 3+ | 2+ | 5–15 | .389 |
| V | 3+ | 2+ | 5–15 | .389 |
| Fe | 3+ | 2+ | 5–15 | .389 |
| Co | 3+ | 2+ | 5–15 | .389 |
| Ni | 3+ | 2+ | 5–15 | .389 |
| Ho | 3+ | 2+ | 10–30 | .650 |

TABLE 1-continued

| Metal M | Highest Oxidation State | Lowest Oxidation State | Si/Al = λ | Maximum Cycle Efficiency |
|---|---|---|---|---|
| Pm | 3+ | 2+ | 10–30 | .650 |
| Sm | 3+ | 2+ | 10–25 | .650 |
| Yb | 3+ | 2+ | 10–25 | .650 |
| Eu | 3+ | 2+ | 5–15 | .650 |
| In | 3+ | 1+ | 5–15 | .403 |
| Tl | 3+ | 1+ | 5–15 | .403 |
| U  | 4+ | 3+ | 5–15 | .461 |
| Ti | 4+ | 3+ | 5–10 | .425 |
| Ru | 4+ | 3+ | 5–10 | .425 |
| Rh | 4+ | 3+ | 5–10 | .425 |

In practice, cycle efficiencies will be less than the maximum values cited in Table 1 due to irreversible heat losses and heat expended in evaporting feedwater and water condensed out of the product gas streams. Nevertheless, for large scale production facilities, such losses will be proportionately of small enough magnitude that production facility efficiencies will be competitive with efficiencies of competing processes including electrolysis of water using heat supplied at the invented process' highest temperature.

To facilitate a description of the process the two chemical reactions are written as follows (s means solid and g means gas):

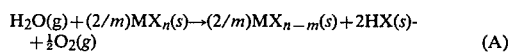

$$H_2O(g) + (2/m)MX_n(s) \rightarrow (2/m)MX_{n-m}(s) + 2HX(s) + \tfrac{1}{2}O_2(g) \quad (A)$$

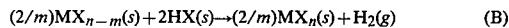

$$(2/m)MX_{n-m}(s) + 2HX(s) \rightarrow (2/m)MX_n(s) + H_2(g) \quad (B)$$

Reactions (A) and (B) constitute a closed two-reaction thermochemical cycle and sum to equal $H_2O(g) \rightarrow H_2(g) + \tfrac{1}{2}O_2(g)$.

In reactions (A) and (B), M is a metal selected from among those listed on Table 1, n+ is the higher oxidation state of M, and (n−m)+ the lower oxidation state of M, respectively. The mordenite mass is understood to be hydrated in that which follows Reaction (A) takes place at the higher temperature and is endothermic and reaction (B) takes place at the lower temperature and is exothermic. $H_2O$ as high pressure steam is supplied as a reactant to reaction (A).

For mordenite, the unit anion $X^-$ in reactions (A) and (B) is represented by the formula

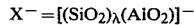

$$X^- = [(SiO_2)_\lambda (AlO_2)]^-$$

As $\lambda = Si/Al$ is increased above 5 during manufacture and processing, the spacing between the anionic $AlO_2^-$ sites lining the large-port mordenite channels increases and the associated cation chemical activities change such that the standard state Gibbs free energies of reaction and related chemical equilibrium constants for reactions (A) and (B) also change. Table 1 cites values of $\lambda = Si/Al$ that make the standard state free energies of reaction favorable to useful reaction conversions at equilibrium temperatures up to 950° C. and equilibrium total pressures of 150 psia and higher. $O_2$ and $H_2$ will thereby be produced at high pressure with a favorable reaction equilibrium at temperatures of 950° C. or lower.

The preferred embodiment of the invention will be further described with reference to the drawing. Referring now to the drawing, reaction vessel 1, wherein the temperature is from 500° to 950° C., contains endothermic reaction (A) above, which results in the production of $O_2$, and reaction vessel 2, wherein the temperature is from 200° to 400° C., contains exothermic reaction (B) above, which results in the production of $H_2$. Both reaction vessels are pressurized to above 150 psia, and to the pressure required to insure that the mordenite masses remain hydrated at the reaction temperatures; but with the pressure in vessel 2 not being so high as to cause the condensation of any steam therein, as could occur because of the relatively low temperature of vessel 2. Initially, the pressure in vessel 1 is created by the admission of high pressure steam reactant at the desired temperature to reaction vessel 1 through line 3 as is shown in the drawing.

Particulate solid reactants and products flow steadily and continuously through reaction vessels 1 and 2 and mass balance is maintained at all times.

$H_2O$ as high pressure steam is admitted to reaction vessel 1 via line 3 where it reacts with and reduces cation $M^{n+}$ and produces cations $M^{(n-m)+}$ and $H^+$ and the product $O_2$. High temperature process heat 16 is supplied to the reactor as reaction heat. A mixture of the product gas $O_2$ with $H_2O$ is fed via line 4 to condenser 5 where $H_2O$ is condensed out and $O_2$ at high pressure taken off for use or storage through line 6. Liquid water is drawn off through line 7 and subsequently evaporated and fed back as a reactant through line 8. The heat involved in this evaporation process constitutes an additional heat input to the process.

The hydrated solid products $MX_{n-m}$ and HX produced in reaction vessel 1 are fed to reaction vessel 2 via line 9. As these products are transported to reaction vessel 2 they are cooled down by transfer of heat to up-coming solid products from reaction vessel 2 being transported as reactants for reaction vessel 1 through line 10. A counter current heat exchange takes place through heat exchanger 11. It is preferred that the heat exchanger capacity be such that the reaction product of vessel 1 be cooled to below 400° C. before passing into vessel 2 and that the reaction product of vessel 2 be heated to above 400° C. before being fed back into vessel 1.

Within reaction vessel 2 the exothermic reaction heat is removed such that the temperature of reaction vessel 2 is 200° C. to 600° C. lower than that of reaction vessel 1, depending upon metal M being used. When the temperature approaches about 300° C., the spontaneous oxidation of the cation $M^{(n-m)+}$ by $H^+$ becomes favorable with consequent production of $H_2$ and hydrated solid product $MX_n$. The mixture of $H_2O$ and $H_2$ is drawn off through line 12 and fed to condenser 13 where $H_2O$ is condensed and drawn off through line 14. High pressure $H_2$ is taken off through line 15 for storage or distribution. The condensed $H_2O$ is evaporated and supplied to $H_2O$ reactant inlet line 3 through line 8. The heat of vaporization supplied constitutes an additional heat input to the process.

The hydrated solid product $MX_n$ produced in reaction vessel 2 is transported through line 10 to reaction vessel 1 where the cycle is repeated. On its way to reaction vessel 1 the product-reactant $MX_n$ passes through counter flow heat exchanger 11 where it is brought up to temperature by heat transfer from the higher temperature products $MX_{n-m}$ and HX passing from reaction vessel 1 to reaction vessel 2 through line 9. In this way intrinsic heat is conserved to the greatest extent possible.

Large-port mordenite is manufactured in a range of particle sizes and pellet sizes and shapes. For the present application particle sizes as small as 5-10 micron powder can be used. Such particle sizes lend themselves to fluidized bed reactors and to pneumatic transport, as by high pressure steam, between reaction vessels. Since pellet sizes up to ⅛" by 1/16" extrudates are manufactured, the particle size can be adjusted to the demands of materials transport and reaction kinetics.

It will be understood that while the invention has been described with reference to particular embodiments thereof, various changes and modifications may be made all within the full and intended scope of the claims which follow.

What is claimed is:

1. A method for producing $O_2$ and $H_2$ from water comprising:

flowing water as steam into contact with large-port hydrated mordenite contained in a first reaction vessel, said mordenite having an Si/Al ratio of from 5 to 30 and containing metal cation in a high oxidation state and selected from the group consisting of Cu, Cr, V, Fe, Co, Ni, Ho, Pm, Yb, Eu, In, Tl, U, Ti Ru and Rh, the temperature in said first reaction vessel being above 500° C. and the pressure in said first reaction vessel being above 150° psia and sufficiently high to prevent dehydration of said mordenite, thereby to cause a reaction of said water with said mordenite which generates $O_2$ and which converts said mordenite to a solid product containing substantially the same number of moles of water of hydration as in said mordenite prior to said reaction and containing the metal cation in a lower oxidation state;

withdrawing $O_2$ from said first reaction vessel;

withdrawing said solid reaction product from said first reaction vessel and passing it through a heat exchanger and then into a second reaction vessel, the pressure in said second reaction vessel being above 150 psia and sufficiently high to prevent dehydration of said solid reaction product, and the temperature in said second reaction vessel being below 400° C. and being at least 200° C. less than the temperature in said first reaction vessel thereby to cause a reaction which generates $H_2$ from said solid reaction product and which converts said solid reaction product to said mordenite containing the metal cation in its high oxidation state;

withdrawing $H_2$ from said second reaction vessel; and withdrawing the mordenite from said second reaction vessel and passing it through said heat exchanger into said first reaction vessel, said mordenite from the second reaction vessel being heated in said heat exchanger by the heat removed in said heat exchanger from said solid reaction product passing through said heat exchanger from said first reaction vessel.

2. A method as set forth in claim 1 wherein in said first reaction vessel the temperature is from 500° to 950° C. and the pressure is from 150 psia to 1500 psia and wherein in said second reaction vessel the temperature is from 200° to 400° C. and the pressure is from 150 to 1200 psia.

3. A method as set forth in claim 1 wherein said mordenite and said solid reaction product are in finely divided form and wherein the water is continuously flowed into said first reaction vessel, the $O_2$ and $H_2$ are continuously withdrawn from said first and second reaction vessels respectively, reaction product from said first reaction vessel is continuously withdrawn and passed through said heat exchanger and into said second reaction vessel and the mordenite from said second reaction vessel is continuously withdrawn and passed through said heat exchanger and into said first reaction vessel.

4. A method as set forth in claim 1 wherein, during passage through said heat exchanger, said solid reaction product is cooled to below 400° C. and said mordenite from said second reaction vessel is heated to above 400° C.

5. A method as set forth in claim 1, 2, 3 or 4 wherein the cation metal of said mordenite is uranium.

6. A method as set forth in claim 1, 2, 3 or 4 wherein the cation metal of said mordenite is thallium.

7. A method as set forth in claim 1, 2, 3 or 4 wherein the cation metal of said mordenite is cobalt.

8. A method as set forth in claim 1, 2, 3 or 4 wherein the cation metal of said mordenite is europium.

9. A method as set forth in claim 1, 2, 3 or 4 wherein the cation metal of said mordenite is vanadium.

* * * * *